(12) United States Patent
Lavan, Jr.

(10) Patent No.: US 6,325,330 B1
(45) Date of Patent: Dec. 4, 2001

(54) POWER GENERATION, TRANSMISSION, AND DISTRIBUTION SYSTEM FOR AN AEROSTAT USING A LIGHTWEIGHT TETHER

(75) Inventor: Charles K. Lavan, Jr., Medina, OH (US)

(73) Assignee: Lockheed Martin Corporation, Akron, OH (US)

( * ) Notice: Subject to any disclaimer, the term of this patent is extended or adjusted under 35 U.S.C. 154(b) by 0 days.

(21) Appl. No.: 09/136,115

(22) Filed: Aug. 18, 1998

(51) Int. Cl.$^7$ ................................................ B64B 1/50
(52) U.S. Cl. ................................................ 244/33; 244/24
(58) Field of Search ................................ 244/24, 31, 33; 174/101.5, 107, 99 R, 126.1, 126.2, 131 A

(56) References Cited

U.S. PATENT DOCUMENTS

| | | | |
|---|---|---|---|
| 3,710,006 | * | 1/1973 | Davis ................................ 174/101.5 |
| 3,717,719 | * | 2/1973 | Smith et al. ........................ 174/101.5 |
| 4,508,934 | * | 4/1985 | Feldman, Jr. ....................... 174/101.5 |
| 4,842,221 | * | 6/1989 | Beach et al. ............................ 244/115 |
| 4,999,640 | * | 3/1991 | Wheeler ................................. 244/115 |
| 5,120,905 | * | 6/1992 | Cousin et al. ...................... 174/101.5 |
| 5,757,157 | * | 5/1998 | Falk et al. ................................ 244/33 |

* cited by examiner

*Primary Examiner*—J. Woodrow Eldred
(74) *Attorney, Agent, or Firm*—Renner, Kenner, Greive, Bobak, Taylor & Weber

(57) ABSTRACT

A power generation, transmission and distribution system for an aerostat using a tether, includes a ground-based power delivery system for generating a multi-phase power signal having a frequency at least greater than 400 Hz, an aerostat-based power distribution system for receiving the multi-phase power signal, and a tether for delivering the multi-phase power signal from the ground-based power delivery system to the aerostat-based power distribution system. The base power system generates a 3, 6, or 12 phase base power signal having a nominal frequency signal received by a rectifier to generate a high voltage DC output. A converter/inverter receives the high voltage DC output and generates the multi-phase power signal transmitted by the tether. A transformer aboard the aerostat steps down the multi-phase power signal and a rectifier processes the stepped-down multi-phase power signal into a DC power delivery signal. A flat bus high voltage power delivery system distributes the DC power delivery signal to instruments carried by the aerostat. The tether includes a central strength member and a plurality of electrical and optical conductors disposed around and bonded to the central strength member. An outer sheath surrounds the plurality of conductors wherein any application of force to the outer sheath is transferred through the plurality of conductors to the central strength member.

21 Claims, 2 Drawing Sheets

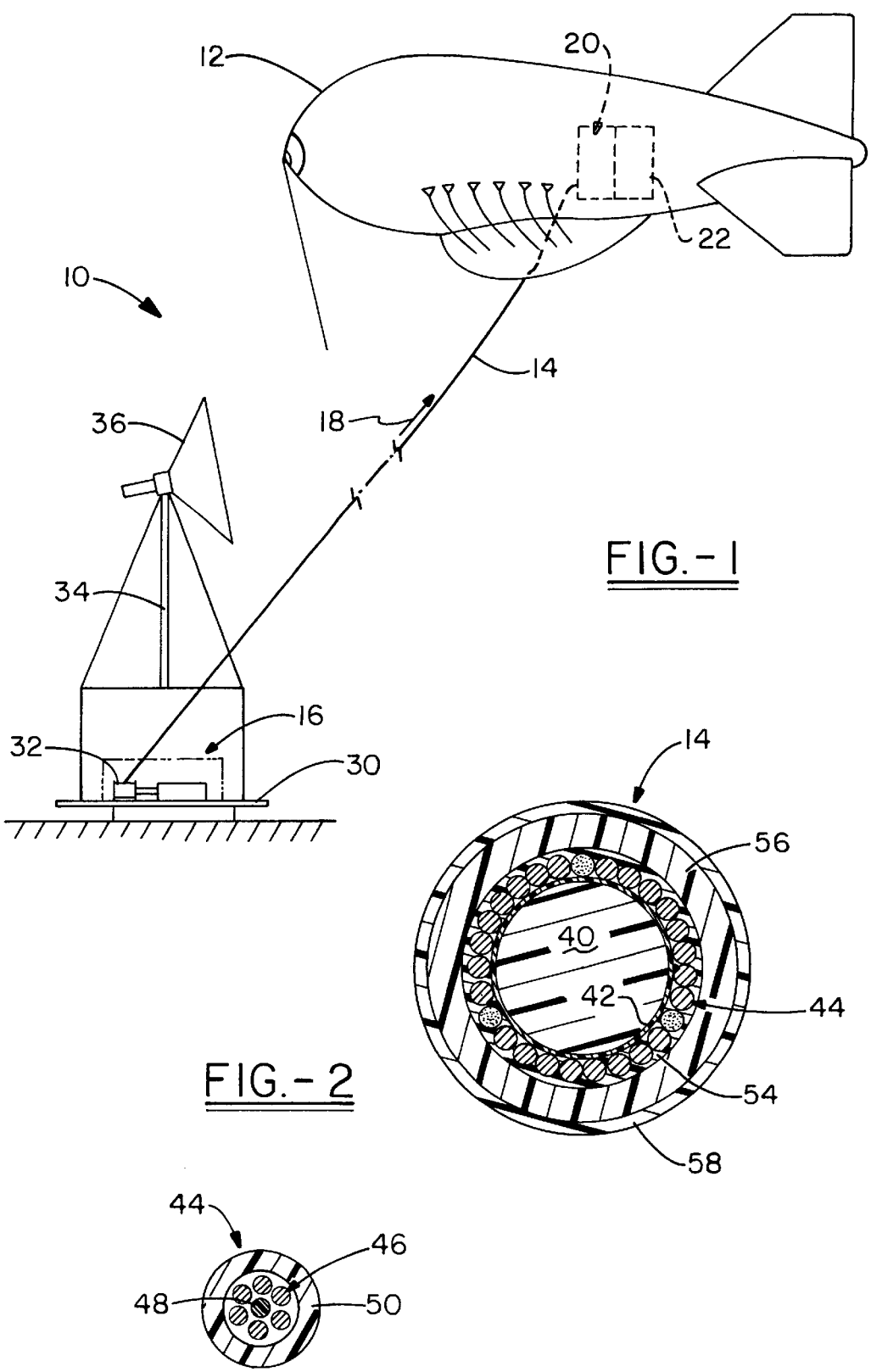

POWER GENERATION, TRANSMISSION, AND DISTRIBUTION SYSTEM FOR AN AEROSTAT USING A LIGHTWEIGHT TETHER

TECHNICAL FIELD

This invention relates to power delivery systems for aerostats. In particular, the present invention relates to a tether-based power delivery system for transferring power from a ground station to a deployed aerostat. Specifically, the present invention relates to a power delivery system for an aerostat that is capable of delivering up to 100 kVA while still being lighter than previously known tether-based power delivery systems.

BACKGROUND ART

Aerostats, which are tethered lighter-than-air vehicles, are typically deployed for surveillance purposes. For example, it is known to provide aerostats with electrical monitoring equipment, such as radar, along geographical borders or areas of military engagement to monitor suspicious activities or opposing forces.

In operation, the aerostat carries electronic surveillance equipment or even temporary cellular communication systems. This equipment is in communication with ground stations so that appropriate personnel can make educated decisions about the area being monitored. The equipment or "payload" carried by the aerostat is typically quite heavy. Accordingly, the heavier the payload, the more helium is required to carry the payload. As will also be appreciated, the electrical equipment must be powered by an on-board generator or tethered power supply.

One known method for providing power to the payload aboard the aerostat is to carry an electrical generator on board. This provides all the necessary power needs of the aerostat in a somewhat efficient manner. Unfortunately, electrical generation equipment is quite heavy and decreases the amount of surveillance equipment that may be carried by the aerostat. Another drawback of employing an on-board power generator is the reduced "availability" of the aerostat. In other words, the generator typically only has enough fuel to power the surveillance equipment for about 5 to 10 days. At the end of this time, the aerostat must be retrieved, serviced, and then re-deployed. This allows the suspicious activity or enemy forces to be unobserved for a significant period of time.

In order to increase the availability of aerostats, ground-based power systems have been developed wherein the power is delivered from a power station via the tether to the aerostat. Another benefit of such a system is that additional surveillance equipment may be installed in place of the now ground-based generator. Moreover, any problems with the generator can be dealt with on the ground instead of having to retrieve the aerostat anytime the generator has a malfunction.

Known tether constructions for providing power to deployed aerostats consist of three electrical conductors centered within a protective sheath. Strength members, such as Kevlar®, are provided in the interstices of the three conductors and about the periphery thereof. Surrounding this core of electrical conductors is a dielectric material which is then covered by a metallic braid to reduce or eliminate any electromagnetic interference that would otherwise be easily detected by opposing forces. The metallic braid is also employed to conduct induced lightning current to ground. Detection of the aerostat would likely result in movement of the suspicious activity or attacks on the aerostat or its ground station.

Although the tether-based power delivery system is more effective than the on-board power delivery system, it will be appreciated that there are significant drawbacks to such a system. In particular, the three-conductor system, which only provides three-phase power, has limited power availability and provides only a transmission frequency of 400 hertz. It is estimated that there is a 50% power loss in transmitting the electrical energy from the ground-based station to the equipment aboard the aerostat. Yet another drawback of the tether-based power delivery systems is that the conductors are centered within the tether and may function as the load members. This subjects the conductors to significant tensile and shearing stresses from the wind and the winches that deploy and retrieve the aerostat. Still yet another drawback of the currently known tether system is that the metallic shielding braid significantly increases the weight of the tether and therefore, reduces the payload that may be carried by the aerostat. By employing low frequency power, heavy magnetic components aboard the aerostat must be used. Accordingly, the payload of the aerostat is further reduced. Yet another drawback of the known tether construction is that if lightning strikes the strength members, they can be severed and the aerostat may be released from the tether and lost. And in a worst case scenario, the aerostat and its payload may fall into enemy hands. Still yet another drawback of the present construction is that if one of the three phases, that is, one of the conductors, is removed from operation, unbalanced power is delivered to the equipment, possibly causing shut down or at least radiated EMI. As such, the aerostat must be retrieved and the tether replaced.

Based upon the foregoing, it is evident that there is a need for a lighter tether that allows for an increase in the payload carried by the aerostat. Moreover, there is need for a tether which provides more power to the payload, provides redundancy and improved power delivery and is configured so as to virtually eliminate electromagnetic interference emanating therefrom.

DISCLOSURE OF INVENTION

It is thus an object of the present invention to provide a power generation, transmission, and distribution system for an aerostat using a lightweight tether.

It is another object of the present invention to provide a ground-based power delivery system for generating a multi-phase power signal having a frequency at least greater than or equal to 400 hertz and which is optimally 20,000 hertz.

It is a further object of the present invention, as above, to provide a power distribution system aboard an aerostat for receiving the multi-phase power signal.

It is yet another object of the present invention to provide a system, as above, in which a tether is employed to deliver the multi-phase power signal from the ground-based power delivery system to the aerostat-based power distribution system.

It is yet another object of the present invention to provide a system, as above, in which a commercially available power system is employed to generate a three-phase nominal frequency signal that is received by a rectifier to provide a high voltage DC output which is received by a converter/inverter to generate the multi-phase signal.

It is still another object of the present invention to provide a system, as above, in which the aerostat-based power system includes a transformer for stepping down the multi-phase power signal, a rectifier for processing the stepped-down multi-phase power signal into a DC power signal and a flat bus high voltage power delivery system for distributing the DC power signal to instruments carried by the aerostat.

It is still a further object of the present invention to provide a system, as above, in which the tether includes a central strength member having a plurality of conductors disposed thereabout and bonded to the central strength member.

It is still a further object of the present invention to provide a system, as above, in which a bonding layer is disposed between the plurality of conductors and the central strength member to assist in the transfer of tensile and shear forces from the outside of the tether to the central strength member.

It is an additional object of the present invention to provide a system, as above, in which the tether employs a transfer layer that encapsulates the plurality of conductors to further secure them to the central strength member.

It is still yet another object of the present invention to provide a system, as above, in which the plurality of conductors are equally distributed about the central strength member so that multi-phase configurations of three-phase, six-phase, nine-phase, or twelve-phase power may be employed.

Still yet another object of the present invention is to provide a system, as above, in which the plurality of conductors deliver power to the aerostat-based power system in excess of 10 kVA and up to 200 kVA.

Still yet a further object of the present invention is to provide a power system, as above, in which $R_{AC}/R_{DC}$ is substantially equal to 1 so that the real losses in the tether conduction process are minimized by using a combination of conductor construction, i.e., Litz wire and a compatible frequency.

Still a further aspect of the present invention is to provide a system, as above, in which delivery of power over the tether has minimal impact on the phase angle between voltage and current waveforms and virtually eliminates electromagnetic interference due to radiated emissions emanating from unbalanced loads within the plurality of conductors.

The foregoing and other objects of the present invention, which shall become apparent as the detailed description proceeds, are achieved by a power generation, transmission and distribution system for an aerostat, comprising a ground-based power delivery system for generating a multi-phase power signal having a frequency at least greater than about 400 Hz, an aerostat-based power distribution system for receiving said multi-phase power signal, and a tether for delivering said multi-phase power signal from said ground-based power delivery system to said aerostat-based power distribution system.

Other aspects of the present invention are attained by a power generation, transmission and distribution system for an aerostat, comprising a ground-based power delivery system for generating a multi-phase power signal having a frequency at least greater than about 400 Hz, the ground-based power delivery system having a base power system for generating a base power signal, the base power signal providing a three phase nominal frequency signal, a rectifier for receiving the base power signal to provide a high voltage DC output, and a converter/inverter for receiving the high voltage DC output for generating the multi-phase power signal, an aerostat-based power distribution system for receiving the multi-phase power signal the aerostat based power system having a transformer for stepping-down the multi-phase power signal, a rectifier for processing the stepped-down multi-phase power signal into a DC power signal, and a flat bus high voltage power delivery system for distributing the DC power signal to instruments carried by the aerostat, and a tether for delivering the multi-phase power signal from the ground-based power delivery system to the aerostat-based power distribution system the tether having a central strength member, a plurality of conductors disposed around and bonded to the central strength member, and an outer sheath surrounding the plurality of conductors wherein any application of force to the outer sheath is transferred through the plurality of conductors to the central strength member.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein:

FIG. 1 is a schematic representation of a power generation, transmission, and distribution system for an aerostat using a lightweight tether according to the present invention;

FIG. 2 is an enlarged schematic cross-sectional view of a tether employed in the present invention;

FIG. 3 is an enlarged schematic cross-sectional view of an electrical conductor employed in the tether.

BEST MODE FOR CARRYING OUT THE INVENTION

Figure 4:
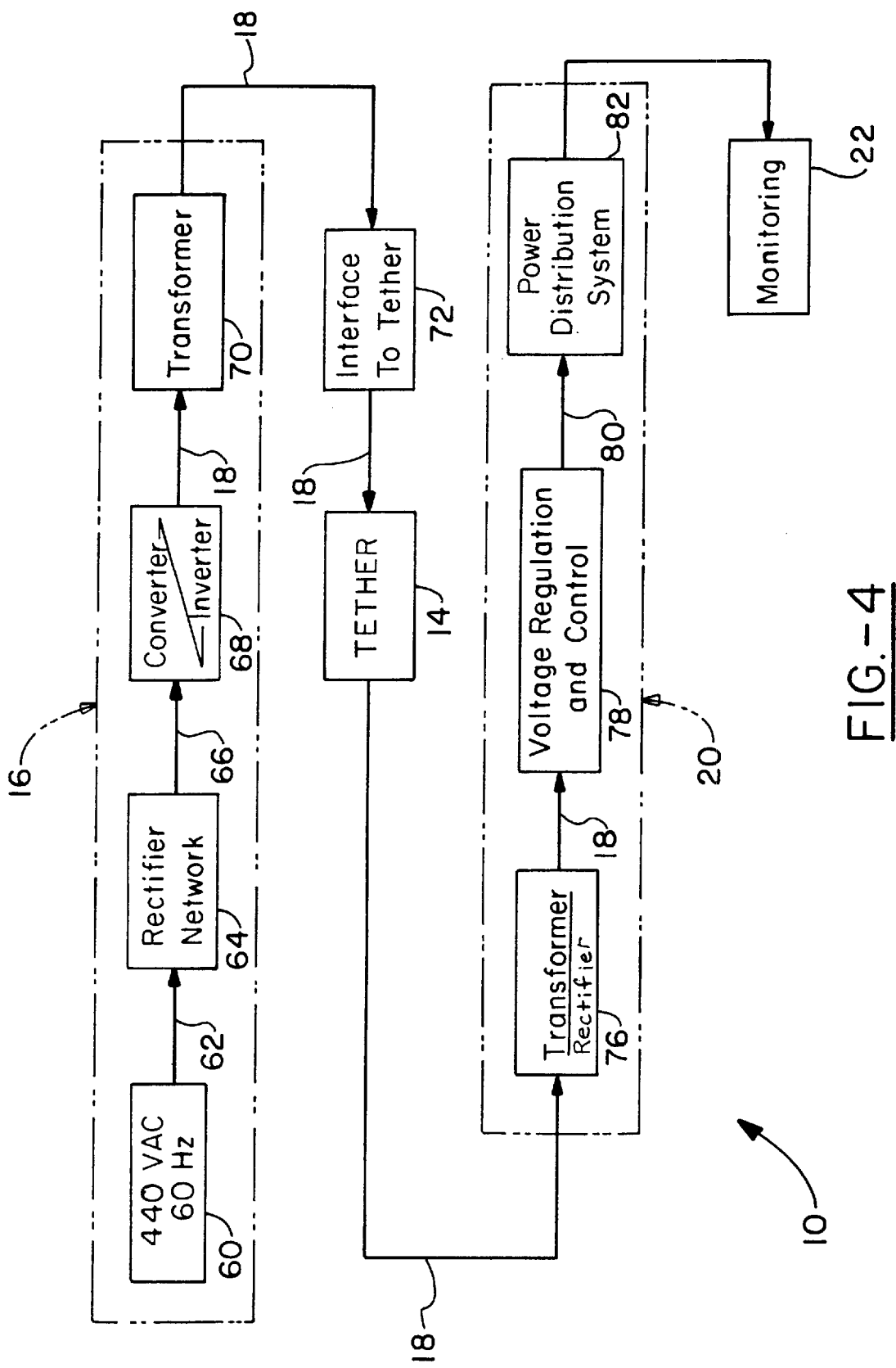
FIG. 4 is a block diagram illustrating the flow of power from a ground-based power delivery system to an aerostat-based power distribution system according to the present invention.

Referring now to the drawings and in particular to FIG. 1, it can be seen that a power generation, transmission, and distribution system for an aerostat is designated generally by the numeral 10. The system 10 allows for deployment of an aerostat 12 by delivering power through a tether 14 from a base power system, which is designated generally by the numeral 16. The base power system 16 generates a multi-phase power signal 18 that is transferred via the tether 14 to an aerostat power system, generally indicated by the numeral 20. Coupled to the aerostat power system 20 is a plurality of monitoring devices 22 such as radar and other surveillance equipment. It is within the scope of the present invention that the aerostat 12 may carry communications equipment such as cellular phone antennae and the like. Use of the present invention is particularly advantageous for maximizing the amount of payload or equipment carried by the aerostat 12 and for providing redundant features to ensure the maximum availability of the aerostat.

A docking platform 30 carries the base power system 16 and is electrically and mechanically connected to the tether 14. The tether 14 is wound about a winch system 32 for deploying and retrieving the aerostat 12 via the tether 14 in a manner well known in the art. It will be appreciated that the winch system 32 may be a series of winches so as to control the deployment of the aerostat. A mast 34 extends from the platform 30 and carries a nose cone 36 which allows for docking and servicing of the aerostat 12.

In order to optimize the delivery of power from the base power system 16 to the aerostat power system 20, full consideration of the structural aspects of the tether 14 and its interrelationship between the base power system 16 and aerostat power system 20 were considered. As best seen in FIGS. 2 and 3, the tether 14 employs a central strength member 40 which in the preferred embodiment, is Vectran® sold by the Hoechst-Celanese Corp., configured in a rope-like construction. The member 40 is coated with a bonding layer 42 which in the preferred embodiment, is an extruded urethane, or other equivalent material which promotes adhesion and shear force transfer. A plurality of electrical and optical conductors 44 are helically wrapped around the bonding layer 42. A nominal range of 15 to 25 degree helix of the plurality of conductors is believed to provide the optimal structural performance of the tether 14. The helix angle was determined by torque balance considerations within the tether construction along with elongation considerations of the individual conductors. The electrical conductors are employed to transfer power from the base power system 16 to the aerostat power system 20 while the optical conductors are employed to transfer data from the surveillance equipment to the docking platform 30 for analysis. As shown in FIG. 2, there are 24 electrical conductors and 3 optical conductors. Of course, the number of conductors may be varied. Where appropriate, fillers may be used to ensure round construction and thus, equal distribution of forces applied to the tether.

Referring now to FIG. 3, each individual electrical conductor 44 contains a stranded electrical wire 46 with an imbedded strength yarn 48, which may either be Vectran® or Kevlar® to increase tensile strength of the conductor 44. The stranded wire 46, which in the preferred embodiment is a Litz wire, is surrounded by an insulation layer 50 such as Hytrel® which is a product of DuPont of Wilmington, Del. The insulation material is selected for its good dielectric strength, corona suppression and shear load transmission into the strength member 40 along with compatibility of the external jacket.

A transfer layer 54 is extruded over the plurality of conductors 44 with a material, preferably Hytrel®, which bonds to the insulation 50 of each conductor and also to the bonding layer 42. Accordingly, a high degree of adhesion is obtained between the strength member 40 and the conductors 44. The transfer layer 54 also functions to fully encapsulate the conductors 44. A dielectric material 56 is then extruded over the transfer layer 54. An outer sheath 58 is then extruded over the dielectric layer 56. Accordingly, the outer sheath 58 provides a low coefficient of friction over the winches, spools, capstans, or drive sheaves that may be encountered.

It is anticipated that by providing a high number of traction winch stages in the winch system 32, the shear load addition at any given state will be minimized. Accordingly, low shear loading increases tether life and avoids stresses of the conductor layer between the outer sheath 58 and the inner strength member 40. It is anticipated that seven or more traction winch stages or linear traction winch assemblies will be used to ensure proper uniform loading of the tether 14.

In disposing the plurality of conductors 44 about the bonding layer 42 and the central strength member 40, it is envisioned that a radius which provides optimal mutual and self-inductance and distributed capacitance will be employed. In order to minimize impedance effects within the tether 14, spacing of the conductor 44 is based on effects of inductance and capacitance on the power factor. Resistive losses are minimized by achieving a conductance equivalent to DC current flow by using a pseudo-Litz wire conductor construction. This construction, when combined with a high frequency wave form generated by the base power system 16, allows for a minimal skin depth for current flow, resulting in $R_{AC}/R_{DC} \approx 1$. Therefore, by minimizing the resistance and optimizing the reactance (inductance and capacitance), the power can be transmitted with high efficiency. Conductor sizing is then based on the steady state load anticipated for the aerostat power system 20.

By employing 24 electrical conductors, a plurality of powerphase configurations may be obtained. Thus, it will be appreciated that a 3-phase, 6-phase, or 12-phase configuration may be provided. For example, with 24 electrical conductors in the tether 14, a 3-phase connection allows up to 8 leads per phase for a Δ-connected system. At a nominal current of 1 A per conductor, this provides an effective power delivery of over 43 kW at unity power factor. If one of the electrical conductors 44 fails, then the other seven conductors in the phase share the increased current load without adversely affecting the balanced load characteristic of the tether 14. The loss of a single conductor simply increases the current per conductor in that phase by approximately 12%.

Another advantage of disposing the electrical conductors about the inner strength member 40 is that the impact of unbalanced loading on electromagnetic interference is virtually eliminated, while also providing a high level of reliability and redundancy. It will be appreciated that the length of the tether 14 may be up to 7600 meters and as such, could be a significant source of electrical noise which aids in detection of the aerostat installation by enemy forces. Thus, it will be appreciated the tether length is nearly optimal for provision of a ¼ wave antennae radiation pattern (dipole radiation) if the balanced load characteristic is not present.

A 12-phase connection with 24 electrical conductors present in the tether 14 provides a similar level of redundancy. Thus, it will be appreciated that if a single conductor fails, there is a corresponding increase in the current carried by the parallel conductor in that phase. As such, a balanced load configuration would still result. The loss of a complete phase would result in an unbalanced load of approximately 8%. This would exhibit minimal electromagnetic interference radiated from the tether 14. The loss of one phase in a 12-phase system has significantly lower impact on radiated EMI than in the equivalent 3-phase case. However, in neither case does the loss of one phase imply the need to retrieve the aerostat immediately.

As noted previously, the plurality of conductors 44 may include optical fibers which would be wrapped in the same helix angle as the electrical conductors. As in the electrical conductors, the optical conductors could be provided with strength members in their respective jackets. It is envisioned that the optical fibers would be spaced at about 120° to each other to equally distribute forces about the central strength member 40. It will be appreciated by those skilled in the art that the optical fibers may be added in groups of three to increase the net bandwidth for any communication systems carried by the aerostat 12.

As noted previously, the tether 14 is terminated to the base power system 16 at a winch take-up spool. Standard slip rings are employed to interconnect the base power system 16 to the tether 14 and in particular, to the conductors 44.

Termination of the tether 14 to the aerostat power system 20 is employed using known thimbles with a back weave of the central strength member 40. This termination is compatible with the conductors and with the use of a variable pick design in the central strength member. As will be appreciated by those skilled in the art, the variable pick design allows the strength at the termination to exceed that of the base tether strength member.

By employing the unique construction of the tether 14 described above, the system 10 is optimized. As best seen in FIG. 4, the base power system 16 includes a standard generator 60 which generates a 440 VAC, 3-phase, 60 hertz signal (or equivalent). This is a standard generator with reasonable regulation of voltage (>5%) and frequency (>1%). It will be appreciated that the system 10 may employ other types of generators by making appropriate adjustments to the components connected downstream of the generator 60. Accordingly, this system can accommodate operational limits of the primary system, improving the reliability thereof and supporting an increase in overall availability of the power system. The base power system 60 generates a base power signal 62 which is received by a rectifier network 64, such as a full wave rectifier to provide or generate a high voltage DC output 66. The output 66 can be controlled within a dual loop by sensing the load voltage at the aerostat 12, the input voltage from the primary generator and controlling the output voltage using an autotransformer function. As will be appreciated by those skilled in the art, this provides coarse system level voltage control.

A converter/inverter 68 receives the high voltage DC output 66 and delivers the multi-phase power signal 18 to a transformer 70. In the preferred embodiment, the converter/inverter 68 is a resonant or switching solid state system which can provide 3-phase to 12-phase power to the tether 14. Various topologies may be employed including the so-called Cûk converter. One possible configuration would be to employ a converter that utilizes four parallel 3-phase inverters, either operating within a phase-locked loop (3-phase system) or operating at a phase stagger of 30° relative to each other (12-phase system). The switched-mode converter is likely to be controlled in a pulse width modulation mode using integrated gate bipolar transistors (IGBT). The switching frequency of the IGBTs is based on the requisite output power quality (harmonic content, waveform) along with the frequency of the transmitted waveform, which is anticipated to be about 20 kHz. The frequency and the power quality may be monitored by the embedded processing function in the converter. The transformer 70 outputs the multi-phase signal 18 at 1800 VAC at 20 kilohertz in any of the multi-phase configurations.

The multi-phase signal 18 is then interfaced to the tether 14 by a slip ring designated generally by the numeral 72 which transfers the multi-phase signal 18 to the tether 14. The signal then travels through the plurality of conductors 44 and is received by the aerostat power system 20. The aerostat power system 20 includes a step-down transformer/rectifier 76 which delivers the high voltage AC signal to a voltage regulation and control circuit 78 which generates a DC power delivery signal 80 to a distribution system 82. In the preferred embodiment, the DC power delivery signal 80 is about 300 volts DC; however, the signal 80 may be varied according to the needs of the monitoring devices 22. In the preferred embodiment, the power distribution system 82 is a flat bus configuration which allows for self-healing fault protection in the event of a lightning strike or other adverse condition.

Based upon the foregoing structure and delivery of power from the base power system 16 to the aerostat power system 20, it will be appreciated that numerous advantages are realized. In particular, the system 10 increases power capacity of the tether by transmitting high frequency AC over Litz wire conductors by virtue of their skin effect. This system 10 also provides a balanced load to ensure minimal conducted/radiated fields in or around the tether for electromagnetic interference and lightning susceptibility. Still yet another advantage of the present invention is that the tether weight is reduced by eliminating the need for a shielding braid while improving the fault tolerance and isolation of the conductors 44. Accordingly, by employing a high frequency signal, the on-board weight of the aerostat 12 is reduced since the high frequency AC allows for lightweight magnetic components to be used. The present construction of the tether 14 in conjunction with the base power system 16 and aerostat power system 20 allows for an increase in the capability of the power system from 10 kVA nominal up to 200 kVA.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation oftrue scope and breadth of the invention, reference should be made to the following claims.

What is claimed is:

1. A power generation, transmission and distribution system for an aerostat, comprising:

a ground-based power delivery system for generating a multi-phase power signal having a frequency at least greater than about 400 Hz;

an aerostat-based power distribution system for receiving said multi-phase power signal; and an unshielded tether for delivering said multi-phase power signal from said ground-based power delivery system to said aerostat-based power distribution system, said tether comprising a non-conductive central strength member;

a bonding layer surrounding said central strength member;

a plurality of conductors disposed around said bonding layer;

a transfer layer bonded to said plurality of conductors and said bonding layers; and an outer sheath surrounding said transfer layer, wherein any application of force to said outer sheath is transferred through said transfer layer to said central strength member.

2. The system according to claim 1, wherein said ground-based power delivery system comprises:

a base power system for generating a base power signal;

a rectifier for receiving said base power signal to provide a high voltage DC output; and a converter/inverter for receiving said high voltage DC output for generating said multi-phase power signal.

3. The system according to claim 2, wherein said ground-based power delivery system further comprises:

a transformer for stepping-up said multi-phase power signal prior to delivery to said tether.

4. The system according to claim 3, wherein said multi-phase power signal is three phase.

5. The system according to claim 3, wherein said multi-phase power signal is up to 12 phase.

6. The system according to claim 3, wherein said multi-phase power signal has a frequency of about 20 kHz.

7. The system according to claim 1, wherein said aerostat based power system comprises:

a transformer for stepping-down said multi-phase power signal;

a rectifier for processing said stepped-down multi-phase power signal into a DC power delivery signal; and a flat bus high voltage power delivery system for distributing said DC power delivery signal to instruments carried by the aerostat.

8. The system according to claim 7, wherein said DC power delivery signal is about 300 volts.

9. The system according to claim 1, wherein said plurality of conductors and said frequency of said multi-phase power signal is configured so that a ratio of $R_{AC}/R_{DC}$ is substantially equal to about 1.

10. The system according to claim 9, wherein said plurality of conductors deliver power to said aerostat-based power system in excess of 10 kVA.

11. The system according to claim 9, wherein said plurality of conductors are configured and positioned about said central strength member to provide balanced loads to substantially eliminate radiation of electromagnetic interference from said tether.

12. The system according to claim 11, wherein each said plurality of conductors includes a non-conductive strength member therein.

13. The system according to claim 11, wherein some of said plurality of conductors transmit electrical signals.

14. The system according to claim 9, wherein said tether further comprises:

a bonding layer disposed about said central strength member, wherein each said plurality of conductors utilizes insulation material that adheres to said bonding layer.

15. The system according to claim 14, wherein said tether further comprises:

a transfer layer that adheres to said conductor insulation material and said bonding layer.

16. The system according to claim 15, wherein said tether further comprises:

a dielectric material disposed between said transfer layer and said outer sheath.

17. A power generation, transmission and distribution system for an aerostat, comprising:

a ground-based power delivery system for generating a multi-phase power signal having a frequency at least greater than about 400 Hz, said ground-based power delivery system having a base power system for generating a base power signal, said base power signal providing a three phase nominal frequency signal, a rectifier for receiving said base power signal to provide a high voltage DC output, and a converter/inverter for receiving said high voltage DC output for generating said multi-phase power signal;

an aerostat-based power distribution system for receiving said multi-phase power signal said aerostat based power system having a transformer for stepping-down said multi-phase power signal, a rectifier for processing said stepped-down multi-phase power signal into a DC power signal, and a flat bus high voltage power delivery system for distributing said DC power signal to instruments carried by the aerostat; and a tether for delivering said multi-phase power signal from said ground-based power delivery system to said aerostat-based power distribution system, said tether having a non-conductive central strength member, a plurality of conductors disposed around and bonded to said central strength member, and an outer sheath surrounding said plurality of conductors wherein any application of force to said outer sheath is transferred through said plurality of conductors to said central strength member.

18. The system according to claim 17, wherein said plurality of conductors and said frequency of said multi-phase power signal is configured so that a ratio of $R_{AC}/R_{DC}$ is substantially equal to about 1.

19. A power generator, transmission and distribution system for an aerostat comprising:

a ground-based power delivery system for generating a multi-phase power signal;

an aerostat-based power distribution system for receiving said multi-phase power signal; and a tether for delivering said multi-phase power signal from said ground-based power delivery system to said aerostat-based power distribution system, said tether comprising a non-conductive central strength member, a plurality of conductors disposed around and bonded to said central strength member, and an outer sheath surrounding said plurality of conductors.

20. The system according to claim 19, further comprising:

a transfer layer encapsulating said plurality of conductors, each of said plurality of conductors having an insulating layer that bonds to said transfer layer.

21. The system according to claim 20, wherein some of said plurality of conductors transmit optical signals.

* * * * *